H. W. WALLACE.
SAW GAGE.
APPLICATION FILED JULY 2, 1913.
1,108,035.
Patented Aug. 18, 1914.
2 SHEETS—SHEET 2.
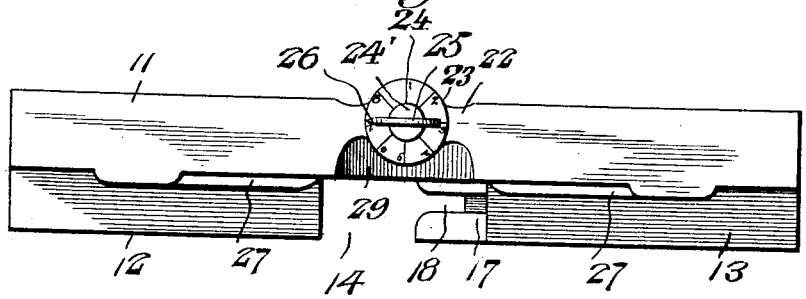
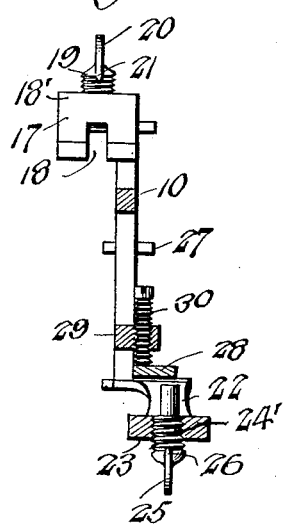
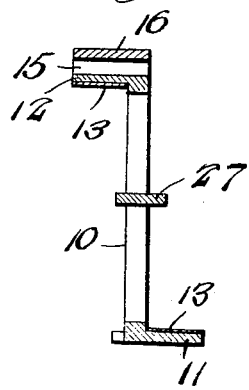
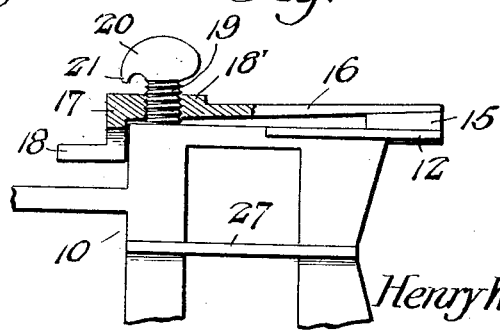
Inventor
Henry W. Wallace
By Victor J. Evans
Attorney
Witnesses

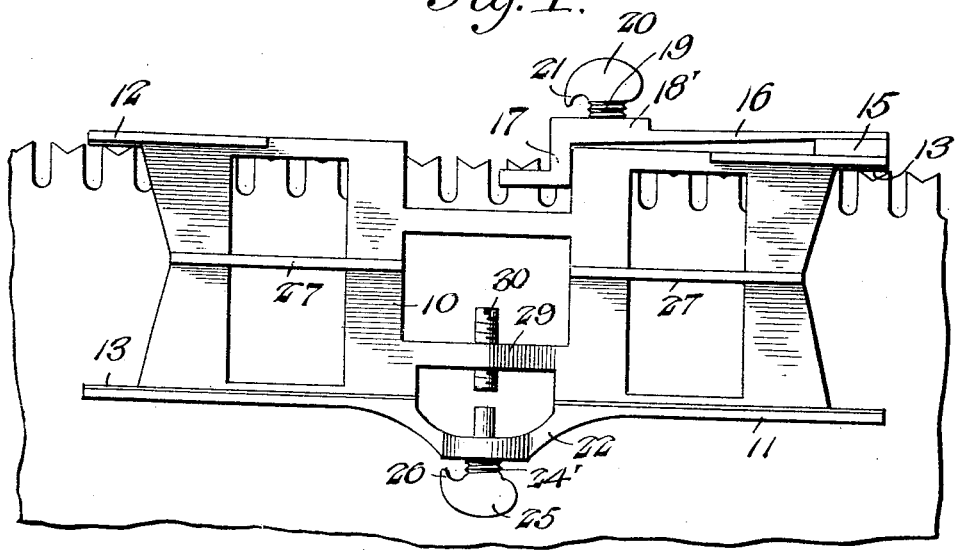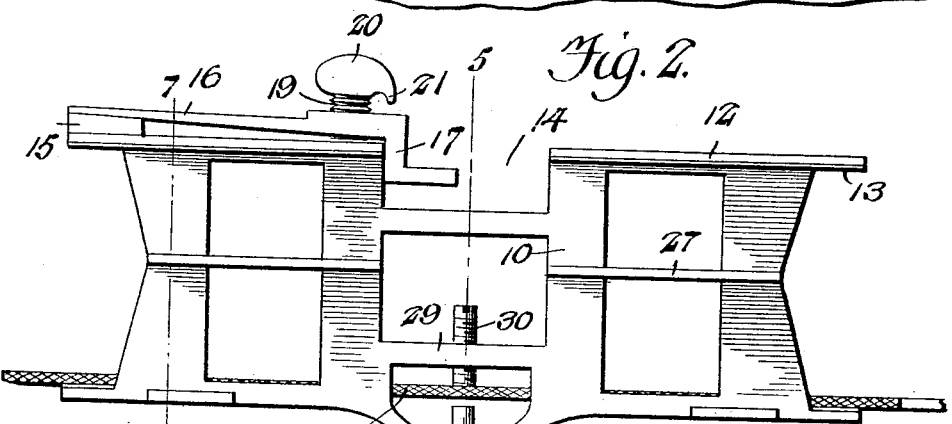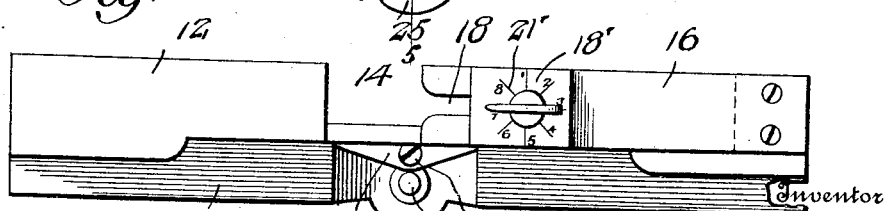

UNITED STATES PATENT OFFICE.

HENRY W. WALLACE, OF MONROE, OREGON.

SAW-GAGE.

1,108,035.

Specification of Letters Patent. Patented Aug. 18, 1914.

Application filed July 2, 1913. Serial No. 777,058.

*To all whom it may concern:*

Be it known that I, HENRY W. WALLACE, a citizen of the United States, residing at Monroe, in the county of Benton and State of Oregon, have invented new and useful Improvements in Saw-Gages, of which the following is a specification.

The invention relates to a saw gage, and more particularly to the class of combined adjustable saw gages, jointers, filing and raker devices or tools.

The primary object of the invention is the provision of a device or tool of this character wherein the teeth of cross cut saws can be gaged, dressed, jointed and filed, irrespective of the size of the saw or the edge thereof, the device or tool being readily, easily and accurately adjusted so as to assure uniformity and accuracy in its operation and also in the finished work.

Another object of the invention is the provision of a device or tool of this character wherein coöperative pointers and dials are arranged so as to enable the operator to make positive and accurate adjustments for the dressing or jointing of the saw teeth, the device being of novel form, simple in construction, readily and easily handled, reliable and efficient in its operation, and inexpensive in manufacture.

With these and other objects in view, the invention consists in the construction, combination and arrangement of parts as will be hereinafter fully described, illustrated in the accompanying drawing, and pointed out in the claims hereunto appended.

In the drawings:—Figure 1 is a side elevation of the device, showing in fragmentary elevation a saw in position for the jointing of its teeth. Fig. 2 is a similar view looking toward the opposite side of the device, the same being in position for engaging the raker teeth. Fig. 3 is a plan view of the device. Fig. 4 is a similar view, looking toward the opposite edge thereof. Fig. 5 is a sectional view on the line 5—5 of Fig. 3. Fig. 6 is a fragmentary vertical longitudinal sectional view through the device. Fig. 7 is a sectional view on the line 7—7 of Fig. 1.

Similar reference characters indicate corresponding parts throughout the several views in the drawings.

Referring to the drawings by numerals, the device comprises a frame 10 which is preferably constructed of light cast metal and which is provided in its body portion with openings to reduce the weight of the device and to lessen the cost of the same. The frame 10 at its side edges is provided with longitudinal side flanges 11 and 12 respectively, the flange 12 being extended laterally in a reverse direction from the lateral direction of the flange 11, and these flanges are formed integral with the body portion of the frame and are disposed at right angles thereto. The inner surfaces of the flanges 11 and 12 are formed with hard steel plates 13 which present flat surfaces against which the teeth of the saw work, so that the latter will not cut into the flanges when the tool is in use. The flange 12 is cut away medially thereof to provide a gap 14, while formed at one end of this flange 12 is an enlargement or boss 15 on which is fixed one end of a resilient leaf arm 16, the free end of which is formed with a substantially L-shaped gage foot 17 provided with a bifurcation 18 into which is received the teeth of the saw. The arm 16 contiguous to the foot 17 is formed with a raised dial 18' in which is centrally threaded an adjusting screw 19 formed with a wing 20 provided with a pointer 21, the latter being designed to coöperate with the graduated marks 21' provided on the dial 18', and this screw 19 works against the flange 12 so that the gage foot 17 can be raised and lowered on the adjustment of the said screw 19, the pointer 21 coöperating with the graduated marks 21' being designed to permit the accurate adjustment of the foot so as to assure the squaring of the raker teeth of the saw, the foot 17 being formed of case hardened steel so as to prevent the file from cutting into the same when the raker teeth of the saw are being squared.

It is of course understood that a number of saw teeth blades require the raker teeth leading from the center to the end of the blade being a fraction longer than the other point of the raker teeth, and the arrangement of the foot 17 and its adjustment will enable the above results to be obtained. The foot 17 is adapted to be set for either filing the points of the raker teeth of uniform length or for making the length of one of the points slightly in excess of the length of the other point of the tooth.

The flange 11 is cut away centrally thereof, and this cut away portion has bridging the same an upwardly bowed bridge piece 22 formed medially with a circular dial portion 23 provided with graduated marks 24 on its outer face, and threaded centrally in the dial portion 23 is an adjusting screw 24' provided with a wing 25 having a pointer 26, the latter being designed to coöperate with the graduated marks 24 for accurately determining the extent of the adjustment of the screw 24', the latter being designed to enable the user of the device to determine accurately the extent to which the raker teeth should be shortened with respect to the cutting teeth of the saw, it being understood of course that the raker teeth are hammered down to a degree so that the inner end of the screw will freely pass over the same.

On opposite sides of the frame 10 medially between the flanges 11 and 12 thereon are formed longitudinally disposed guiding ribs 27 against which one of the faces of the saw blade is disposed so that the device will be properly guided thereon when gaging the teeth for jointing or filing of the same. The file 28 is detachably secured between the inner face of the flange 11 and a central laterally projecting wing 29 integrally formed with the frame by means of a clamping screw 30 carried by the said wing 29. The screw 30 is mounted in the wing 29 as shown so that the file may be securely clamped to the frame whereby the said file will project outwardly from the contiguous face of the body portion of the frame a sufficient distance to extend over the teeth of the saw blade when the latter is disposed against the guide ribs 27 so that the device can be moved along the saw blade as will be clearly apparent.

It is of course understood that the graduated marks are scaled according to the pitch of the threads of the screws 19 and 24' so that a positive and accurate adjustment can be had on bringing the pointers 21 and 26 in registration with any of the marks on the dial respectively.

From the foregoing it is thought that the construction and manner of operation of the device will be clearly understood, and therefore a more extended explanation has been omitted.

What is claimed is:—

1. A gage comprising a frame having lateral reversely extending flanges at opposite longitudinal edges thereof, the said flanges being cut away at medial alining points thereof, a bridge piece spanning the cut away portion in one flange and having a dial face medially thereof provided with graduated marks, an adjusting screw threaded through the dial face and having a pointer coöperating with the graduating marks, a resilient arm fixed to the other flange, a substantially L-shaped bifurcated foot formed on the free end of the arm and working in the cut away portion in the said flange, a raised dial face formed on the said arm, an adjusting screw threaded through the last-named dial face and working against the flange adjacent thereto, said last-named dial face being provided with graduating marks, and a pointer formed on the last-named adjustable screw and coöperative with the last-named graduating marks.

2. A gage comprising a frame having lateral reversely extending flanges at opposite longitudinal edges thereof, the said flanges being cut away at medial alining points thereof, a bridge piece spanning the cut away portion in one flange and having a dial face medially thereof provided with graduated marks, an adjusting screw threaded through the dial face and having a pointer coöperating with the graduating marks, a resilient arm fixed to the other flange, a substantially L-shaped bifurcated foot formed on the free end of the arm and working in the cut away portion in the said flange, a raised dial face formed on the said arm, an adjusting screw threaded through the last-named dial face and working against the flange adjacent thereto, said last-named dial face being provided with graduating marks, a pointer formed on the last-named adjustable screw and coöperative with the last-named graduating marks, and ribs projecting outwardly from opposite sides of the frame medially thereof.

3. A gage comprising a frame having lateral reversely extending flanges at opposite longitudinal edges thereof, the said flanges being cut away at medial alining points thereof, a bridge piece spanning the cut away portion in one flange and having a dial face medially thereof provided with graduated marks, an adjusting screw threaded through the dial face and having a pointer coöperating with the graduating marks, a resilient arm fixed to the other flange, a substantially L-shaped bifurcated foot formed on the free end of the arm and working in the cut away portion in the said flange, a raised dial face formed on the said arm, an adjusting screw threaded through the last-named dial face and working against the flange adjacent thereto, said last-named dial face being provided with graduating marks, a pointer formed on the last-named adjustable screw and coöperative with the last-named graduating marks, ribs projecting outwardly from opposite sides of the frame medially thereof, a web formed in the frame spaced from the bridge piece, and an adjusting screw threaded in said web and adapted to fasten a file to the frame.

In testimony whereof I affix my signature in presence of two witnesses.

HENRY W. WALLACE.

Witnesses:
J. S. MARTIN,
M. C. WALTZ.

Copies of this patent may be obtained for five cents each, by addressing the "Commissioner of Patents, Washington, D. C."